US012154737B2

(12) United States Patent
Kim

(10) Patent No.: US 12,154,737 B2
(45) Date of Patent: Nov. 26, 2024

(54) ARC EXTINGUISHING ASSEMBLY AND CIRCUIT BREAKER COMPRISING SAME

(71) Applicant: LS ELECTRIC CO., LTD., Anyang-si (KR)

(72) Inventor: Il Hyun Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 177 days.

(21) Appl. No.: 17/916,696

(22) PCT Filed: Mar. 3, 2021

(86) PCT No.: PCT/KR2021/002590
§ 371 (c)(1),
(2) Date: Oct. 3, 2022

(87) PCT Pub. No.: WO2021/201445
PCT Pub. Date: Oct. 7, 2021

(65) Prior Publication Data

US 2023/0154707 A1 May 18, 2023

(30) Foreign Application Priority Data

Apr. 2, 2020 (KR) ........................ 10-2020-0040425

(51) Int. Cl.
*H01H 33/70* (2006.01)

(52) U.S. Cl.
CPC ............................... *H01H 33/7069* (2013.01)

(58) Field of Classification Search
CPC .... H01H 33/7069; H01H 33/04; H01H 33/06; H01H 33/08; H01H 33/10; H01H 33/20;
(Continued)

(56) References Cited

U.S. PATENT DOCUMENTS 4,082,931 A 4/1978 Hayes
6,373,016 B2 * 4/2002 Brouillat ................ H01H 9/446 218/157
(Continued)

FOREIGN PATENT DOCUMENTS

CN 109036905 A 12/2018
EP 1083203 A1 3/2001
(Continued)

OTHER PUBLICATIONS

Translation of JP11-176267 (Original document published Feb. 7, 1999) (Year: 1999).*
(Continued)

*Primary Examiner* — William A Bolton
(74) *Attorney, Agent, or Firm* — K&L Gates LLP

(57) ABSTRACT

The present disclosure relates to an arc extinguishing assembly, including side members which are spaced apart by a certain distance and disposed to face each other; an exhaust which is installed at an upper part of the side member; a plurality of grids which are installed between the side members and having both ends fixed to each of the side members; and an arc guide whose one side is coupled to the side member and which is installed at a lower part of the plurality of grids, wherein the arc guide is made of a material having heat resistance, and a circuit breaker including the same.

10 Claims, 9 Drawing Sheets

(58) Field of Classification Search

CPC .. H01H 2033/085; H01H 9/342; H01H 9/341; H01H 9/345; H01H 9/346; H01H 9/36; H01H 9/362; H01H 9/46; H01H 2009/347; H01H 2009/348; H01H 2009/365; H01H 2009/367; H01H 71/0235; H01H 71/02; H01H 73/18

USPC ... 218/34–38, 40, 43, 46, 51, 68, 76, 81, 90

See application file for complete search history.

(56) References Cited

U.S. PATENT DOCUMENTS

| | | | | |
|---|---|---|---|---|
| 7,186,941 | B2 * | 3/2007 | Yeon | H01H 9/346 218/15 |
| 7,285,742 | B2 * | 10/2007 | Kinzler | H01H 71/0207 335/201 |
| 7,674,996 | B2 * | 3/2010 | Shea | H01H 9/362 335/201 |
| 8,390,406 | B2 * | 3/2013 | An | H01H 9/362 335/157 |
| 10,192,700 | B2 * | 1/2019 | Rival | H01H 33/10 |
| 2008/0067042 | A1 | 3/2008 | Shea et al. | |
| 2009/0261070 | A1 | 10/2009 | Haberer | |
| 2013/0284702 | A1 * | 10/2013 | Hamada | H01H 9/346 218/26 |

FOREIGN PATENT DOCUMENTS

| | | | |
|---|---|---|---|
| EP | 1244128 | B1 | 7/2007 |
| JP | S52-044077 | U | 4/1977 |
| JP | S61-000643 | U | 1/1986 |
| JP | H01-140524 | A | 1/1989 |
| JP | H11-176267 | A | 2/1999 |
| JP | 11176267 | A | 7/1999 |
| KR | 100728863 | B1 | 6/2007 |
| KR | 20130133555 | A | 12/2013 |
| KR | 1020130133555 | A | 12/2013 |
| KR | 1020180027098 | A | 3/2018 |
| KR | 20180048151 | A | 5/2018 |
| KR | 1020180048151 | A | 5/2018 |

OTHER PUBLICATIONS

Translation of KR20180048151(Original document published May 10, 2018) (Year: 2018).*

Office Action for related Japanese Application No. 10-2020-0031562; action dated Oct. 17, 2023; (6 pages).

International Search Report for related International Application No. PCT/KR2021/002590; report dated Oct. 7, 2021; (5 pages).

Written Opinion for related International Application No. PCT/KR2021/002590; report dated Oct. 7, 2021; (5 pages).

Notice of Allowance for related Japanese Application No. 2022-558204; action dated Feb. 6, 2024; (3 pages).

European Search Report for related European Application No. 21781766.7; action dated Mar. 19, 2024; (12 pages).

* cited by examiner

| | 16A | | 32A | | 64A | |
|---|---|---|---|---|---|---|
| | Forward connection average arcing time(ms) | Reverse connection average arcing time(ms) | Forward connection average arcing time(ms) | Reverse connection average arcing time(ms) | Forward connection average arcing time(ms) | Reverse connection average arcing time(ms) |
| Fiber-reinforced plastic | 55.8 | 81.5 | 47 | 81.5 | 234.0 | 109.9 |
| Polyamide resinv (PA66) | 31.7 | 22.1 | 43.6 | 20.9 | 130 | 72.3 |

FIG. 8

ARC EXTINGUISHING ASSEMBLY AND CIRCUIT BREAKER COMPRISING SAME

CROSS-REFERENCE TO RELATED APPLICATION

The present application is a National Stage of International Application No. PCT/KR2021/002590 filed on Mar. 3, 2021, which claims priority to and the benefit of Korean Utility Model Application No. 10-2020-0040425, filed on Apr. 2, 2020, the disclosure of which is incorporated herein by reference in its entirety.

FIELD

The present disclosure relates to a circuit breaker including an arc extinguishing assembly for effectively extinguishing an arc generated by blocking an electric current.

BACKGROUND

A circuit breaker is a device that blocks the flow of current when abnormal current such as electrical leakage, short circuit or excessive current occurs in the circuit. Through this, it is possible to prevent an accident that may occur in a circuit or an electronic device connected to the circuit. The circuit breaker is energably installed at a specific position in the circuit such that the current of the circuit passes through the circuit breaker.

The circuit breaker is connected such that when a normal current flows, the movable contact point is in contact with the stationary contact point, and when the movable contact point and the stationary contact point are in contact with each other, the circuit can conduct electricity.

When an overcurrent or abnormal current flows through the circuit breaker, the movable contact point and the stationary contact point in contact are spaced apart from each other. In this case, the current flowing between the movable contact point and the stationary contact point is not immediately extinguished, but is changed in the form of an arc and is extended along the movable contact point.

The arc is a flow of high-temperature and high-pressure electrons, and when the generated arc stays in the circuit breaker for a long period of time, there is a risk of damage to each component of the circuit breaker. In addition, when the arc is discharged to the outside of the circuit breaker without a separate treatment process, there is a risk of injury to the user.

Accordingly, the circuit breaker is provided with an arc extinguishing assembly for discharging while extinguishing the arc. The generated arc is passed through the extinguishing device, the arc pressure is increased, the moving speed is increased, and it is cooled at the same time and can be discharged to the outside.

A conventional circuit breaker (Korean Utility Model Application No. 20-2008-0009468) discloses the structure of an air circuit breaker, which is stacked with a certain gap in the arc chamber and includes a grid in which an induction groove is formed such that a contact point can be located, and a grid plate which is provided on the side wall of the guide groove of the grid.

The circuit breaker serves to guide the arc toward the grid through the guide plate, and an arc guide is installed inside the arc extinguishing assembly to effectively form a path of the arc along the grid.

In general, the arc guide is made of a material with strong heat resistance, and is generally made of fiber-reinforced plastic such as bulk molding compound (BMC) or sheet molding compound (SMC), which is a plastic composite material using glass fiber as a reinforcing material.

However, when glass fiber is included as the material of the arc guide, the arc generated when the current is blocked causes a phenomenon in which the glass fiber is ionized between the arc guide, resulting in a problem in that the insulation performance is weakened while being charged. Accordingly, there is a problem in the method of securing the insulation performance as well as the heat resistance and strength of the arc guide.

SUMMARY

An object of the present disclosure is to provide an arc extinguishing assembly including an arc guide such that the generated arc can be extended to a grid and a runner.

Another object of the present disclosure is to provide an arc extinguishing assembly including an arc guide that can smoothly form a movement path of the arc even when a small current is blocked and can also secure heat resistance.

Still another object of the present disclosure is to provide an arc extinguishing assembly including an arc guide which is capable of ensuring stable performance even if there is continuous exposure to a high-temperature environment.

The arc extinguishing assembly for solving the above-described problems according to the present disclosure may include side members which are spaced apart by a certain distance and disposed to face each other; an exhaust which is installed at an upper part of the side member; a plurality of grids which are installed between the side members and having both ends fixed to each of the side members; and an arc guide whose one side is coupled to the side member and which is installed at a lower part of the plurality of grids, wherein the arc guide may be made of a material having heat resistance.

According to an example of the present disclosure, the arc guide may be formed of a polyamide resin.

According to an example of the present disclosure, the polyamide resin may include any one of nylon 6 (PA6) and nylon 66 (PA66).

According to an example of the present disclosure, the arc guide may be formed of a ceramic material.

According to an example of the present disclosure, a ceramic coating layer may be formed on the outer surface of the arc guide.

According to an example of the present disclosure, the arc guide may be respectively installed on both sides of the inner surface of the side member, and wherein the arc guide may include a first extension portion which is coupled to the side member; and a second extension portion having a predetermined angle with the first extension portion and formed to extend from the first extension portion.

According to an example of the present disclosure, at least one area of the first extension portion and the second extension portion may be coated with a ceramic layer.

According to an example of the present disclosure, the first extension portion and the second extension portion may be made of a ceramic material.

According to an example of the present disclosure, a ceramic layer may be coated on the outer surface of the first extension portion and the second extension portion to face the grid.

According to an example of the present disclosure, the arc extinguishing assembly may further include an arc runner which is inserted between the side members, is spaced apart from one side of the plurality of grids by a certain distance, and is bent toward a lower part of the grid.

The circuit breaker for solving the above-described problems according to the present disclosure may include a stationary contact; a movable contact which moves in a direction toward the stationary contact or in a direction away from the stationary contact; and an arc extinguishing assembly which is located adjacent to the stationary contact and the movable contact to extinguish an arc generated by the stationary contact and the movable contact being spaced apart, wherein the arc extinguishing assembly may include side members which are spaced apart by a certain distance and disposed to face each other; an exhaust which is installed at an upper part of the side member; a plurality of grids which are installed between the side members and having both ends fixed to each of the side members; and an arc guide whose one side is coupled to the side member and which is installed at a lower part of the plurality of grids, wherein the arc guide may be made of a material having heat resistance.

According to an example of the present disclosure, the arc guide may be made of a polyamide resin, and wherein the polyamide resin includes any one of nylon 6 (PA6) and nylon 66 (PA66).

According to an example of the present disclosure, the arc guide may be formed of a ceramic material.

According to an example of the present disclosure, a ceramic coating layer may be formed on the outer surface of the arc guide.

According to an example of the present disclosure, the arc guide may be respectively installed on both sides of the inner surface of the side member, and wherein the arc guide may include a first extension portion which is coupled to the side member; and a second extension portion having a predetermined angle with the first extension portion and formed to extend from the first extension portion, wherein at least one area of the first extension portion and the second extension portion may be coated with a ceramic layer.

By the structure of the arc extinguishing assembly as described above, the arc extinguishing performance can be secured by increasing the extension speed of an arc in a direction that the generated arc flows on the arc guide and moves toward the arc runner.

In addition, the arc guide provided in the arc extinguishing assembly is made of a plastic-based composite material from which glass fibers are removed or made of a ceramic material so as to prevent the deterioration of insulation performance while securing heat resistance such that it is possible to secure mechanical properties and durability. Through this, even when a small current is blocked, it is possible to prevent the arc guide from being damaged and the insulation performance from being weakened.

BRIEF DESCRIPTION OF THE DRAWINGS

FIG. 8 is a table showing the average arcing time when the arc guide is made of fiber-reinforced plastic and when the arc guide is made of polyamide 66 (PA66 or nylon 66), which is a heat-resistant single material.

DETAILED DESCRIPTION

Figure 1:
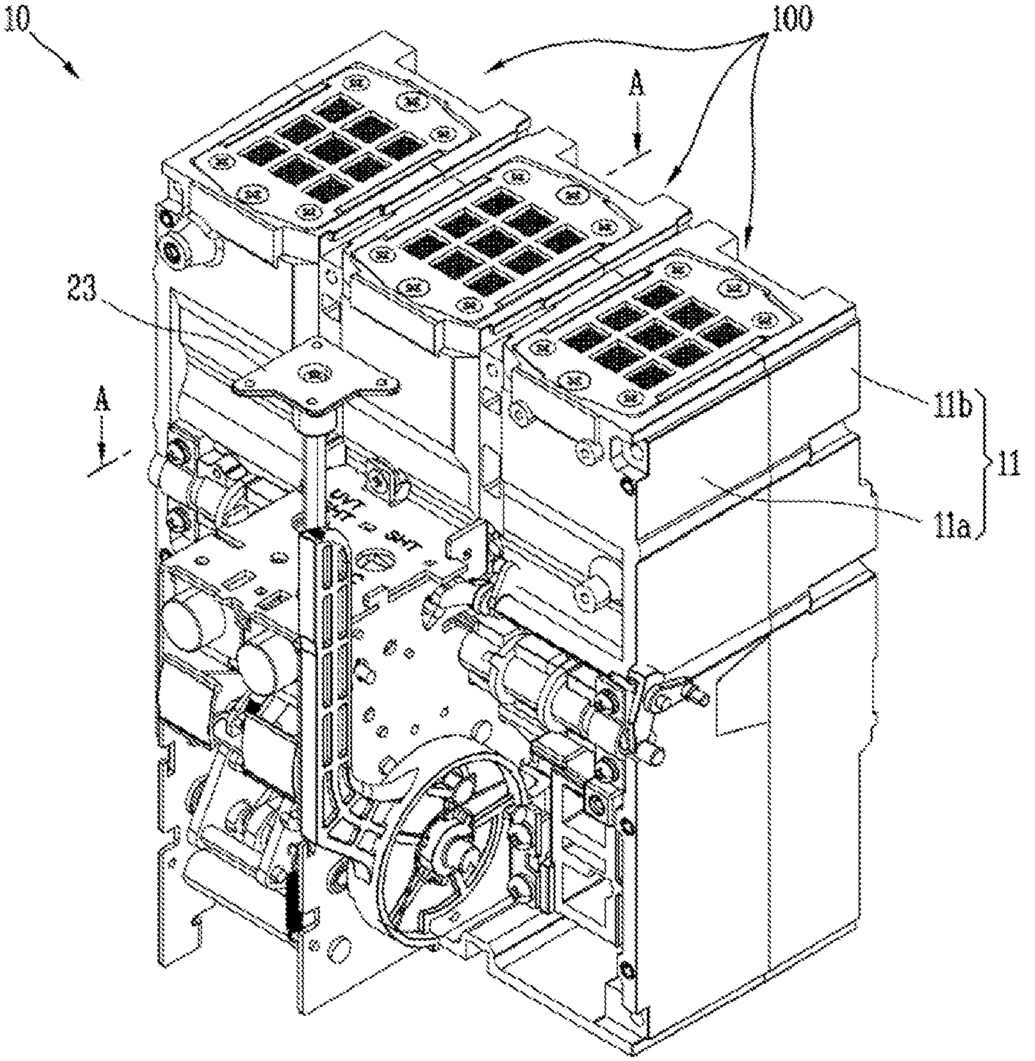
FIG. 1 is a perspective view showing the mode of a circuit breaker.

Hereinafter, the exemplary embodiments disclosed in the present specification will be described in more detail with reference to the attached drawings, and the same or equivalent components will be provided with the same reference numerals, and the description thereof will not be repeated. The terms "module" and "unit or portion" for components used in the following description are merely provided only for facilitation of preparing this specification, and thus, they are not granted a specific meaning or function. In describing the exemplary embodiments disclosed in the present specification, if it is determined that the detailed descriptions of related known technologies may obscure the gist of the exemplary embodiments disclosed in the present specification, the detailed descriptions thereof will be omitted. In addition, the accompanying drawings are only for easy understanding of the exemplary embodiments disclosed in the present specification, and the technical spirit disclosed herein is not limited by the accompanying drawings, and all changes included in the spirit and scope of the present disclosure should be understood to include equivalents or substitutes.

It will be understood that although the terms such as first, second and the like may be used herein to describe various elements, these elements should not be limited by these terms. These terms are generally only used to distinguish one element from another.

It will be understood that when an element is referred to as being "connected with" or "joined to" another element, it may be directly connected with or joined to the other element, but another element may exist in the middle. On the other hand, when it is mentioned that a certain element is "directly connected with" or "directly joined to" another element, it should be understood that no other element is present in the middle.

A singular representation may include a plural representation unless it represents a definitely different meaning from the context.

In the present application, terms such as "include" or "have" are intended to designate that a feature, number, step, operation, component, part or combination thereof described in the specification exists, and it should be understood that it does not preclude the possibility of addition or existence of one or more other features or numbers, steps, operations, components, parts or combinations thereof.

Figure 2:
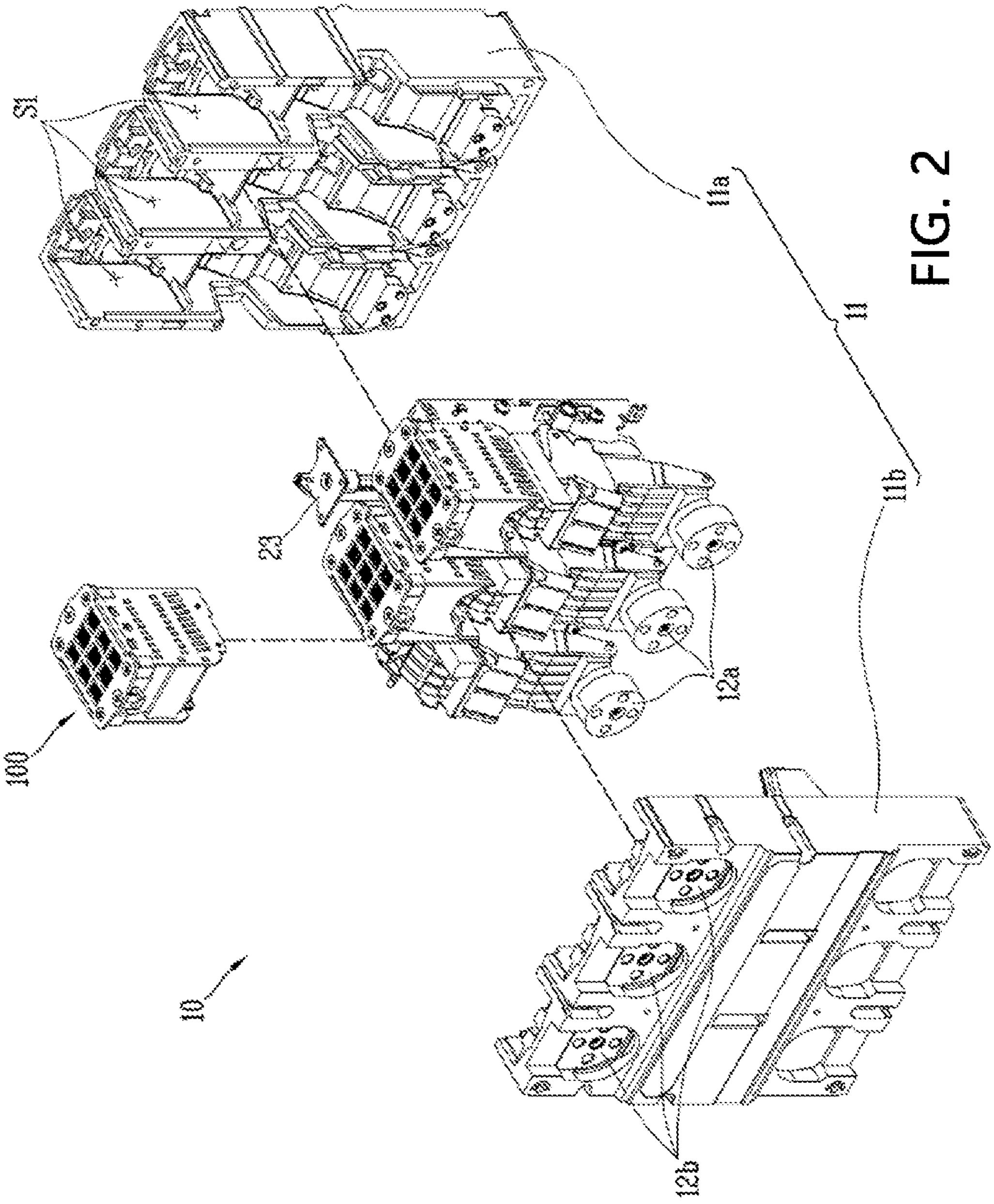
FIG. 2 is an exploded perspective view of the circuit breaker.
Figure 3:
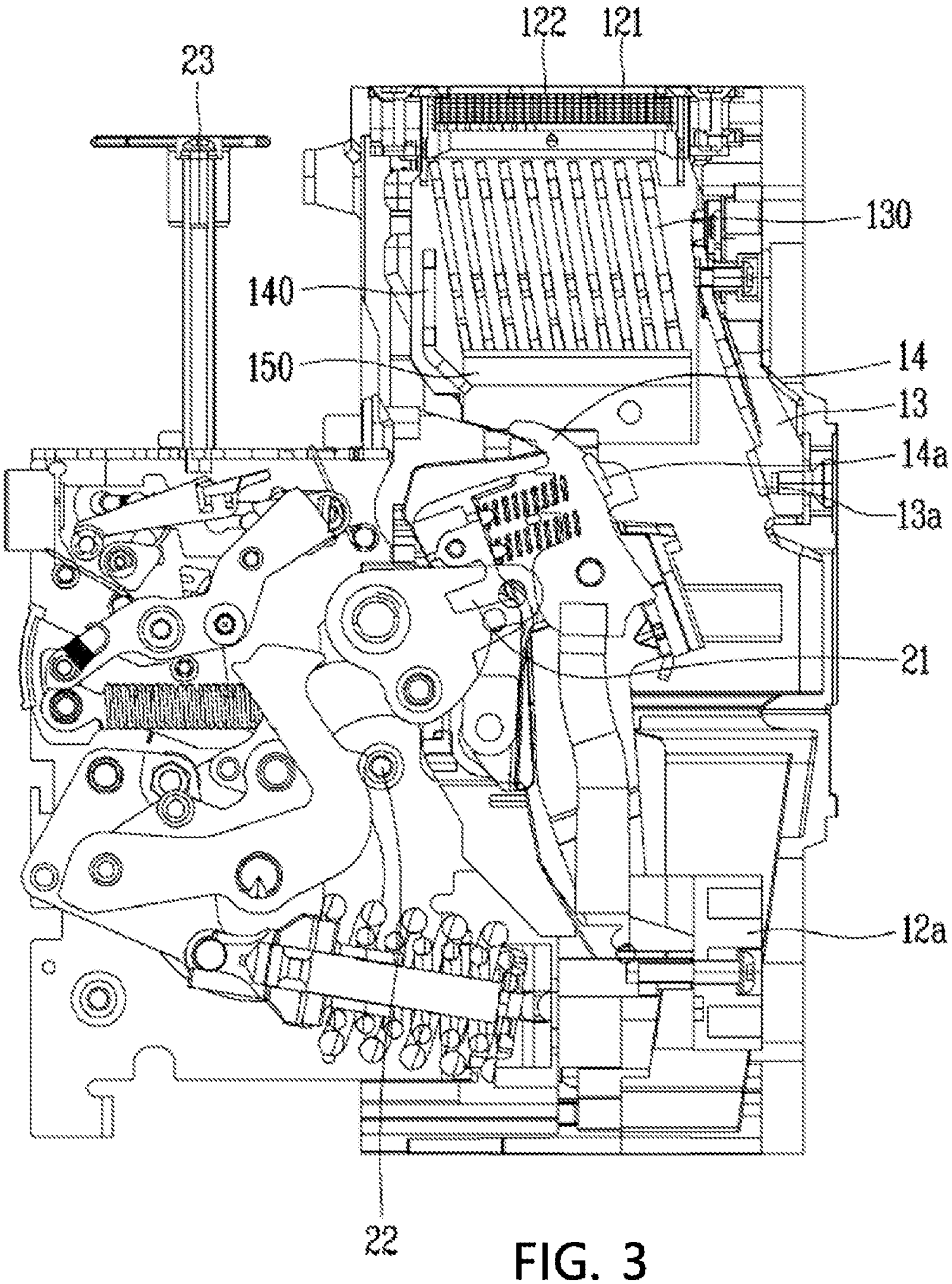
FIG. 3 is a cross-sectional view of the circuit breaker taken along line A-A'.

FIG. 1 is a perspective view showing the mode of a circuit breaker, FIG. 2 is an exploded perspective view of the circuit breaker, and FIG. 3 is a cross-sectional view of the circuit breaker taken along line A-A'.

In the present specification, the circuit breaker 10 serves to block the flow of current when an abnormal current occurs, and may refer to an air circuit breaker.

Herein, the air circuit breaker is a type of circuit breaker, and when an abnormal current exceeding a preset current range value leaks from the circuit breaker, it means a device that blocks the flow of current in the circuit.

The circuit breaker 10 may include a circuit breaker body 11 which forms an exterior and has an accommodation space (S1) therein. A plurality of arc extinguishing assemblies 100 may be installed inside the circuit breaker body 11.

A front side cover 11*b* and a rear side cover 11*a* constituting the circuit breaker body 11 are coupled along the opposite direction to form an inner space (S1).

In this case, the circuit breaker body 11 may be formed of a material having high heat resistance and high rigidity. This is to prevent damage to each component mounted therein, and to prevent damage by an arc generated inside. For example, the circuit breaker body 11 may be made of a synthetic resin or reinforced plastic.

The internal space (S1) of the circuit breaker body 11 may conduct electricity with the outside, and each component mounted therein may be connected to conduct electricity with an external power source or load.

A power supply side connection portion 12*a* connected to the power supply side so as to conduct electricity, and a load side connection portion 12*b* connected to the load side so as to conduct electricity may be respectively installed in the front part of the circuit breaker body 11.

Further, in the accommodation space (S1) formed by the coupling of the front side cover 11*b* and the rear side cover 11*a*, a stationary contact 13 and a movable contact 14 may be respectively installed for blocking or conducting electricity with the power supply side connection portion 12*a* and the load side connection portion 12*b*.

A stationary contact point 13*a* may be formed in the stationary contact 13, and a movable contact point 14*a* may be formed in the movable contact 14. Accordingly, when a normal current flows in the circuit, the stationary contact point 13*a* and the movable contact point 14*a* are in contact with each other such that a current may flow between the power supply side connection portion 12*a* and the load side connection portion 12*b*.

As shown in FIG. 3, a shooter 21 may be configured to rotate together as the movable contact 14 is rotated away from the stationary contact 13.

The shooter 21 may be installed to be connected to a crossbar 22 and a lever 23. Specifically, one end of the shooter 21 is restrained by the crossbar 22, and an elastic member is provided at the other end of the shooter 21.

In a state where the stationary contact point 13*a* and the movable contact point 14*a* are in contact with each other, the shooter 21 presses the elastic member and stores a restoring force. In this case, the external force for pressing may be provided by a state where the crossbar 22 is rotated toward the stationary contact 13.

When the movable contact point 14*a* is located to be spaced apart from the stationary contact point 13*a*, the movable contact 14 is rotated in a direction away from the stationary contact point 13. In this case, rotation of the crossbar 22 may be made, and specifically, one end of the shooter 21 may be released and rotated by the restoring force provided by the elastic member. As the shooter 21 rotates and strikes the lever 23, the lever 23 is also rotated to perform a trip mechanism.

The lever 23 is partially exposed to the outside of the air circuit breaker 10, and the lever 23 may be rotated by striking the rotated shooter 21. When the trip mechanism is performed, the lever 23 may be rotated in a preset direction, and the user may easily recognize that the trip mechanism has been performed. In addition, the user may rotate the lever 23 to adjust the air circuit breaker 10 to a state that may conduct electricity again.

That is, in the circuit breaker 10, when an abnormal current flows in the circuit, the movable contact 14 is rotated by a predetermined angle in a direction away from the stationary contact 13, and as the stationary contact point 13*a* and the movable contact point 14*a* are spaced apart from each other, the flow of current may be blocked.

In this case, when the movable contact point 14*a* and the stationary contact point 13*a* are spaced apart from each other, an arc is generated between the movable contact point 14*a* and the stationary contact point 13*a*.

The arc is a plasma of high-temperature electrons and ions, and when the generated arc stays in the circuit breaker internal space for a long period of time, there is a risk of damage to each component of the circuit breaker.

In addition, when the arc is discharged to the outside of the circuit breaker without a separate treatment process, there is a risk of injury to the user.

If the arc is not extinguished quickly, the components that make up the circuit breaker will be damaged. The circuit breaker 10 is provided with an extinguishing device for discharging while extinguishing the arc, and the generated arc passes through the extinguishing device, the arc pressure is increased, the moving speed is increased, and the arc is cooled and discharged to the outside.

In the circuit breaker 10 according to the present disclosure, the arc extinguishing assembly 100 for extinguishing an arc generated above the stationary contact point 13*a* and the movable contact point 14*a* may be configured to be installed.

Hereinafter, the structure of the arc extinguishing assembly 100 will be described in detail.

Figure 4:
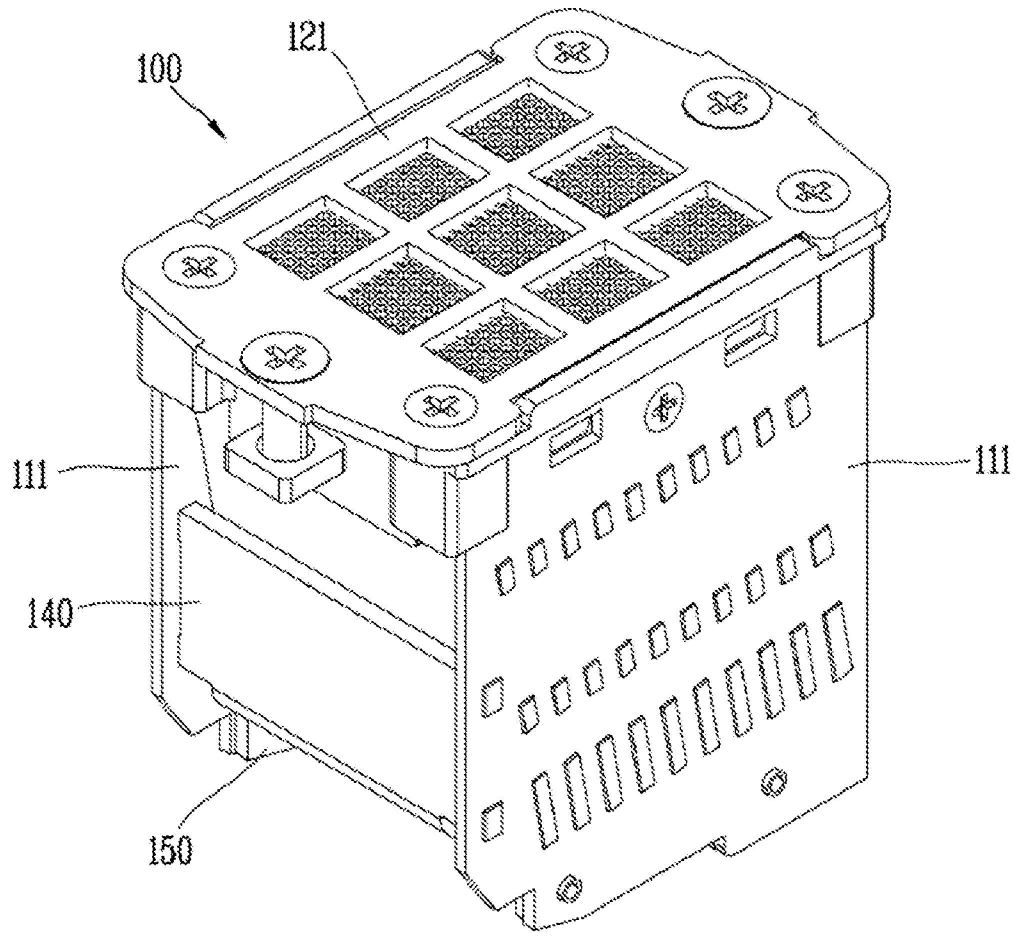
FIG. 4 is a perspective view which shows the mode of an arc extinguishing assembly.
Figure 5:
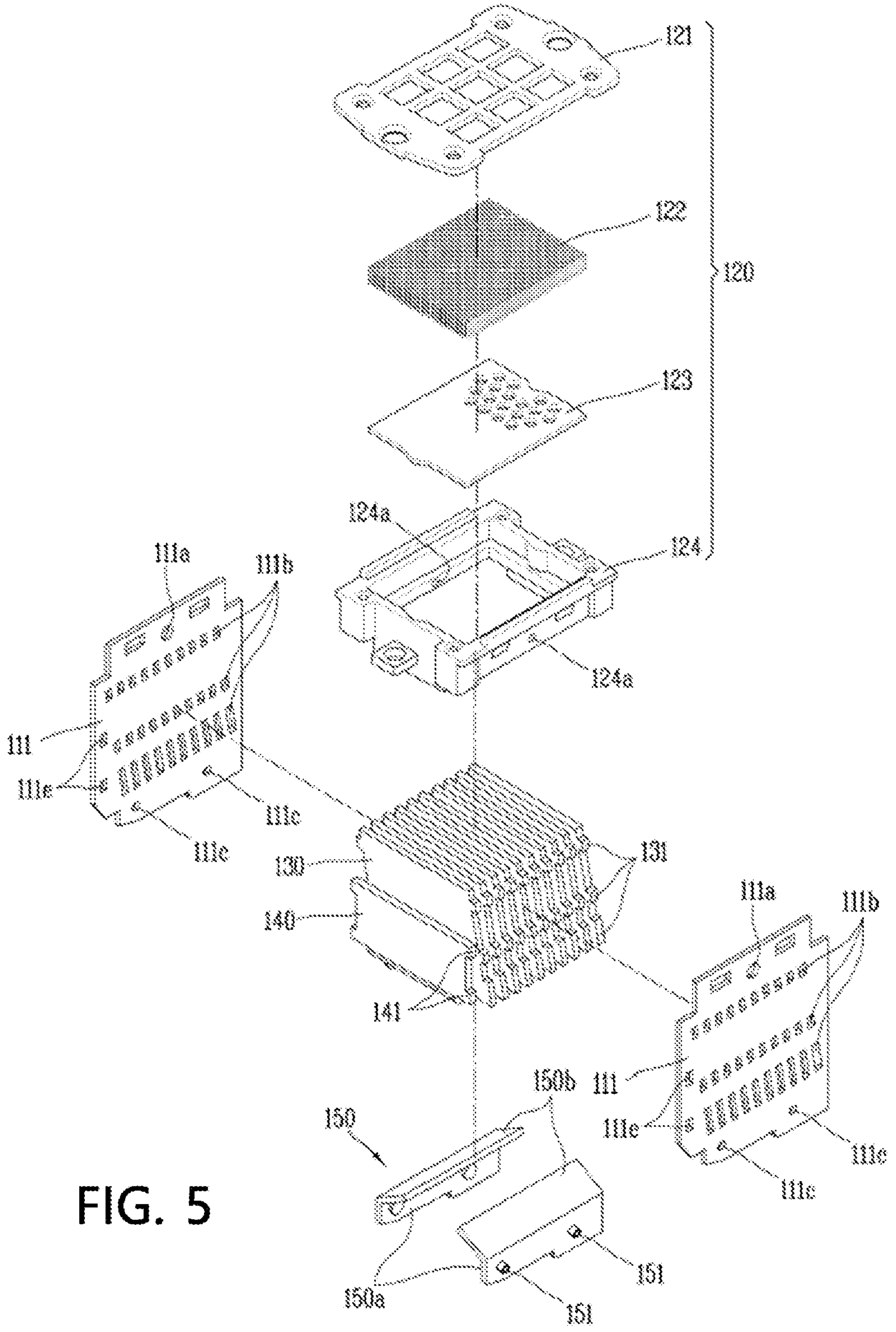
FIG. 5 is an exploded perspective view of the arc extinguishing assembly of FIG. 4.
Figure 6:
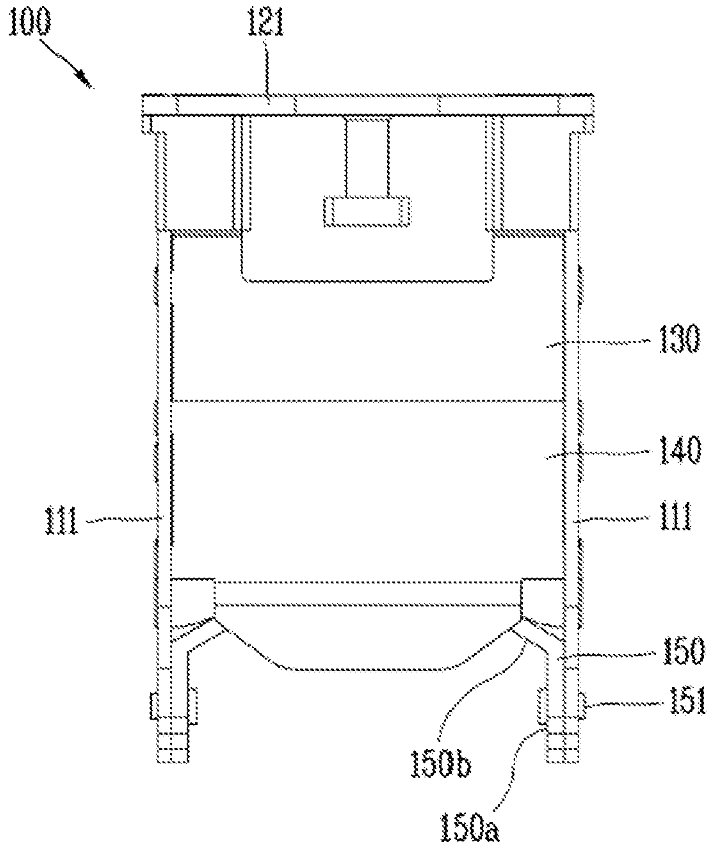
FIG. 6 is a side view of the arc extinguishing assembly.
Figure 7:
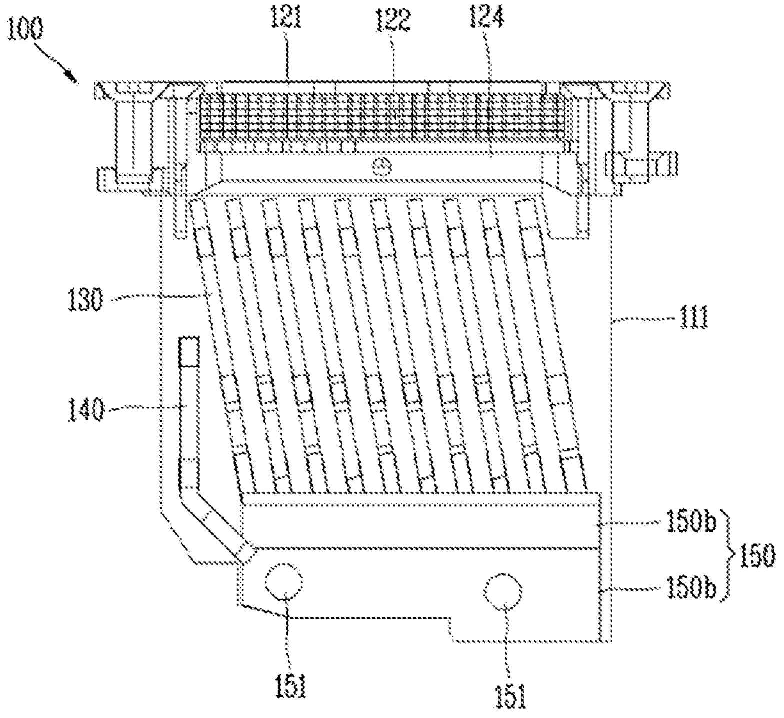
FIG. 7 is a cross-sectional view showing the internal mode of the arc extinguishing assembly.

FIG. 4 is a perspective view which shows the mode of an arc extinguishing assembly, and FIG. 5 is an exploded perspective view of the arc extinguishing assembly of FIG. 4. In addition, FIG. 6 is a side view of the arc extinguishing assembly, and FIG. 7 is a cross-sectional view showing the internal mode of the arc extinguishing assembly.

The arc extinguishing assembly 100 may be inserted and installed on one open side of the accommodation space (S1) formed inside the body 11. After the arc generated in the circuit breaker 10 is extinguished by the arc extinguishing assembly 100, it is discharged to the outside of the circuit breaker 10 through an exhaust 120 of the arc extinguishing assembly 100.

The arc extinguishing assembly 100 includes a pair of side members 111 coupled to the exhaust 120, a grid 130, an arc runner 140 and an arc guide 150, and the arc generated in the circuit breaker 10 may be extended in the course of flowing through the grid 130 and the arc runner 140 of the arc extinguishing assembly 100.

Looking at the structure of the arc extinguishing assembly 100, the exhaust 120 for discharging the extinguished arc may be formed on the plurality of grids 130. Herein, the exhaust 120 functions as a passage through which the metal gas is discharged to the outside of the circuit breaker 10.

The exhaust 120 may include an exhaust body 124, an insulating plate 123, a filter 122 and an exhaust cover 121.

A pair of side members 111 are respectively coupled to the left and right side surfaces of the exhaust body 124, and the accommodation portion in which the insulating plate 123 and the filter 122 are accommodated is formed to be recessed in the central part of the upper surface of the exhaust body 124, and a plurality of exhaust holes may be formed to pass through in the insulating plate 123.

An exhaust cover 121 is coupled to an upper surface of the exhaust body 124, and a plurality of gas outlets may be formed through a central part of the exhaust cover 121.

In the exhaust 120, the insulating plate 123, the filter 122, and the exhaust cover 121 may be sequentially located from the lower side to the upper side. The metal gas introduced into the exhaust hole (not illustrated) of the insulating plate 123 may be discharged to the outside of the circuit breaker 10 through a gas outlet (not illustrated) after passing through the filter 122.

The arc extinguishing assembly 100 may be coupled to the body 11 of the circuit breaker 10 through the exhaust 120.

Fastening holes (not illustrated) are respectively formed on the front side and the rear side of the exhaust cover 121, and in a state where the exhaust cover 121 covers the opening of the accommodation space (S1) of the circuit breaker 10, a fastening member (not illustrated) may be coupled to the circuit breaker body 11 through the fastening hole.

The exhaust 120 may function as a pressure increasing means inside the arc extinguishing assembly 100. Specifically, the exhaust 120 covers the opening of the accommodation space (S1) such that the pressure inside the arc extinguishing assembly 100 may momentarily be increased when the metal gas is generated. In this case, a temporary pressure difference is generated between the pressure inside the arc extinguishing assembly 100 and the outside of the circuit breaker 10, and the metal gas may move toward the exhaust hole of the exhaust 120.

The side members 111 are spaced apart from each other by a certain distance and may be formed in a pair of plate-like shapes disposed to face each other, and a grid 130 and an arc runner 140 are disposed between the side members 111.

In addition, the central part of the side member 111 may be formed such that a grid fastening hole 111*b* and an arc runner fastening hole 111*e* pass through.

A grid fastening protrusion 131 and an arc runner fastening protrusion 141 may be respectively inserted into the grid fastening hole 111*b* and the arc runner fastening hole 111*e*.

The grid fastening hole 111*b* and the arc runner fastening hole 111*e* may be in sizes corresponding to the grid fastening protrusion 131 and the arc runner fastening protrusion 141 or having a slightly smaller area than this. Accordingly, the grid fastening protrusions 131 and the arc runner fastening protrusions 141 are press-fitted into the grid fastening holes 111*b* and the arc runner fastening holes 111*e*, respectively, such that they may be fixed.

An arc guide 150 may be coupled to each side member 111, respectively. An arc guide fastening hole 111*c* for coupling with the arc guide 150 is formed to pass through the lower side of the side member 111. The arc guide fastening hole 111*c* may be formed in the shape of a cylindrical hole formed to pass through one side of the side member 111.

The arc guide fastening hole 111*c* may be formed in plurality, and may be respectively formed at positions spaced apart from each other by a predetermined interval. In addition, arc guide fastening portions 151 to be described below are respectively coupled to each arc guide fastening hole 111*c* such that the arc guide 150 may be fixed to the side member 111.

The arc guide 150 may be located below the side member 111, and one side of the arc guide 150 may be installed to be in close contact with the side member 111.

To this end, an arc guide fastening portion 151 may be formed to protrude in a direction toward the side member 111 on one side surface of the arc guide 150. Accordingly, the arc guide fastening portion 151 protruding from the arc guide 150 is coupled to the arc guide fastening hole 111*c* such that the arc guide 150 may be coupled to the side member 111. In this case, the arc guide fastening portion 151 may be formed in plurality, and may be coupled to each arc guide fastening portion 151 spaced apart from each other. For example, the arc guide fastening portion 151 may be formed of two, and may be disposed at positions that are spaced apart from each other.

The arc guide 150 includes a first extension portion 150*a* and a second extension portion 150*b*.

The first extension portion 150*a* refers to a part where the arc guide 150 is coupled to the side member 111, and the first extension portion 150*a* is located at a lower part of the side member 111. The first extension portion 150*a* may be coupled to the inner surface of the side member 111 by the arc guide fastening portion 151.

In addition, the first extension portion 150*a* may be formed to extend in contact with the side member 111 in a direction toward the grid 130. The first extension portion 150*a* may be formed to extend in parallel to the side member 111.

The second extension portion 150*b* may be formed to extend from an end of the first extension 150*a*, and may be bent in a direction toward the grid 130 to partially enclose the same.

The second extension portion 150*b* may be formed to extend at a predetermined angle to the first extension portion 150*a*. For example, the second extension portion 150*b* may be formed to extend to form an obtuse angle with the first extension portion 150*a*. In addition, the second extension portion 150*b* may be formed to extend toward the end of the grid 130.

In general, the arc guide 150 is generally made of a material with strong heat resistance. In particular, recently, the arc guide 150 is made of fiber-reinforced plastics such as bulk molding compound (BMC) or sheet molding compound (SMC), which are plastic-based composite materials using glass fiber as a reinforcing material.

Herein, the glass fiber has high temperature resistance and chemical resistance, and has high tensile strength. In addition, glass fibers have high electrical insulation properties and low abrasion resistance.

However, when the arc guide 150 is formed of fiber-reinforced plastic, a phenomenon in which the glass fiber is ionized occurs between the arc generated when the arc is blocked and the arc guide 150 is generated, and thus, problems may occur in that the insulation performance is weakened. That is, when the arc guide 150 is made of fiber-reinforced plastic including glass fibers, since it becomes charged through interaction with the arc, the arc duration is increased and the current blocking performance is deteriorated.

Accordingly, the arc guide 150 of the arc extinguishing assembly 100 according to the present disclosure may be made of a plastic-based composite material from which glass fibers are removed so as to prevent the deterioration of insulation performance while ensuring heat resistance.

For example, the arc extinguishing assembly 100 may be made of a single heat-resistant material, and may be made of a polyamide resin.

Polyamide resin may mean a nylon resin, and for example, it may mean nylon 6 (PA6) or nylon 66 (PA66). Polyamide has the properties of mechanical strength, heat resistance, abrasion resistance, chemical resistance and self-extinguishing properties (flame retardancy), and because of its excellent processability, it has a characteristic that it is easy to combine with other materials.

Polyamide is used in a wide range of fields such as automobile parts, electrical/electronic parts, mechanical parts, building material parts, medical supplies and household goods.

According to the present disclosure, the arc guide 150 may be made of any one of nylon 6 (PA6) and nylon 66 (PA66), which do not include glass fibers.

In addition, the arc guide 150 according to the present disclosure may be made of a composite polyamide resin composition in which nylon 6 (PA6) and nylon 66 (PA66) are mixed.

For example, when the arc guide 150 is made of polyamide 6 (PA6), the injection properties are excellent, and when mixed with polyamide 66, they may be melted together, and the miscibility may be excellent and the injection properties may be maintained.

In addition, the arc guide 150 may be made of polyamide 66 (PA66), and polyamide 66 has a weight average molecular weight of 11,000 to 21,000 g/mol, and has excellent mechanical rigidity and heat resistance.

In addition, the arc guide 150 is made of the same raw material as the polyamide resin, which does not include glass fibers, and as a result of performing the current blocking test of the circuit breaker, the arc duration was reduced, and thus, it was confirmed that the current breaking performance may be improved.

In addition, looking at the side member 111, a screw fastening hole 111*a* for coupling with the exhaust 120 is formed on the upper side of the side member 111, and a pair of side members 111 may be respectively coupled to the exhaust 120. A screw coupling groove 124*a* for coupling with the side member 111 may be formed in the exhaust body 124.

In a state where the side member 111 is coupled to the exhaust body 124, a fastening screw (not illustrated) passes through the screw fastening hole 111*a* and is coupled to the screw coupling groove 124*a*.

The grid 130 is formed in a plate shape and has a structure in which a plurality of grids are spaced apart from each other by a predetermined interval in one direction away from the stationary contact point 13*a* to be stacked.

Grid fastening protrusions 131 are formed to protrude from both side surfaces of the grid 130 and are located to be inserted into the grid fastening holes 111*b*. The grid 130 may be fixed between the pair of side members 111.

The grid 130 may be made of any material capable of applying electromagnetic attraction to the arc, and for example, it may be made of iron (Fe).

As the arc is extended and moved between the plurality of grids 130, the arc voltage may be increased and the arc may be cooled.

The arc runner 140 is formed in a plate shape, and may be spaced apart from the plurality of grids 130 by a predetermined distance in the rear side.

The arc runner 140 serves to guide the arc such that the generated arc flows toward the grid 130. The generated arc may be prevented from proceeding to the cover beyond the grid 130 by the arc runner 140. Accordingly, it is possible to prevent damage to the covers 11*a*, 11*b* of the circuit breaker 10 by the generated arc.

The generated arc extends to the lower end of the arc runner 140 and flows along the arc runner 140. If the arc does not reach the arc runner 140, the arc extinguishing performance may be reduced, and thus, the lower end of the arc runner 140 may be curved toward the stationary contact point 13*a*.

The lower end of the arc runner 140 which is formed to be curved is located below the grid 130 which is located on the rear side among the plurality of grids 130. Due to the curved structure of the arc runner 140, the distance between the lower end of the arc runner 140 and the stationary contact point 13*a* may be shortened.

The arc runner 140 may be formed of any material capable of applying electromagnetic attraction to the arc, and for example, the arc runner may be formed of an iron (Fe) material.

FIG. 8 is a table showing the average arcing time when the arc guide is made of fiber-reinforced plastic and when the arc guide is made of polyamide 66 (PA66 or nylon 66), which is a heat-resistant single material.

As described above, when an abnormal current is detected and the movable contact point 14*a* is spaced apart from the stationary contact point 13*a*, a metal gas is instantaneously generated, and an arc flows through the generated metal gas.

When the metal gas is generated, the pressure of the part where the metal gas is generated is momentarily increased, and as a result, the metal gas is raised toward the exhaust 120 of the arc extinguishing assembly 100 by the pressure difference. As a result, the arc flowing through the metal gas is raised and extended in an arcuate shape.

The generated arc passes through the space between the arc guide 150 and moves to the grid 130 and the arc runner 140, and must undergo the extinguishing process in the grid 130 and the arc runner 140 to be discharged to the outside of the circuit breaker 10.

The generated arc is a flow of high-temperature and high-pressure electrons and is preferably discharged to the outside of the circuit breaker 10 within a short period of time. To this end, it is preferable that the generated arc is rapidly extended from the stationary contact point 13*a* to the farthest arc runner 140 and then rapidly extended toward the exhaust 120.

In this case, the arc guide 150 serves to guide the arc such that the generated arc flows along the grid 130.

The arc guide 150 may apply a force to the arc in a direction toward the upper part of the arc extinguishing assembly 100 even if the direction of current movement is changed according to the forward or reverse connection of the circuit breaker. Accordingly, the arc will be able to be extinguished more smoothly on the grid 130.

The arc guide 150 may be made of a plastic-based composite material from which glass fibers are removed so as to prevent the deterioration of insulation performance while ensuring heat resistance. For example, the arc extinguishing assembly 100 may be made of a heat-resistant single material, and may be made of a polyamide resin.

Herein, the polyamide resin may mean a nylon resin, and for example, it may mean nylon 66 (PA66). Polyamide has the properties of mechanical strength, heat resistance, abrasion resistance, chemical resistance and self-extinguishing properties (flame retardancy), and because of its excellent processability, it has a characteristic that it is easy to combine with other materials.

In addition, as shown in FIG. 8, when the arc guide 150 is made of fiber-reinforced plastic including glass fibers, it can be confirmed that the average arcing time in the overall forward connection and reverse connection is greater than that of the arc guide 150 made of polyamide 66 (PA66), which is a single heat-resistant material. An increase in the average arcing time in the forward and reverse connections means that the arc duration is large, which means that the current breaking performance is low.

For example, when the forward connection and reverse connection currents applied to the circuit breaker 10 were 16A, when the arc guide 150 was made of fiber-reinforced plastic including glass fibers, the average arcing time for forward connection was about 55.8 (ms), and the average arcing time for reverse connection was about 81.5 (ms).

On the other hand, when the arc guide 150 was formed by using polyamide resin (PA66) that does not include glass fibers, the average arcing time for forward connection was about 31.7 (ms), and the average arcing time for reverse connection was about 22.1 (ms), and thus, it was confirmed that the arc duration was lower than that of fiber-reinforced plastic including glass fibers.

Similarly, even when the current applied to the circuit breaker 10 was 32 (A) or 64 (A), when the arc guide 150 was formed by using polyamide resin (PA66) that does not include glass fibers, it was confirmed that the arc duration was lower than that of fiber-reinforced plastic including fibers.

Figure 9A:
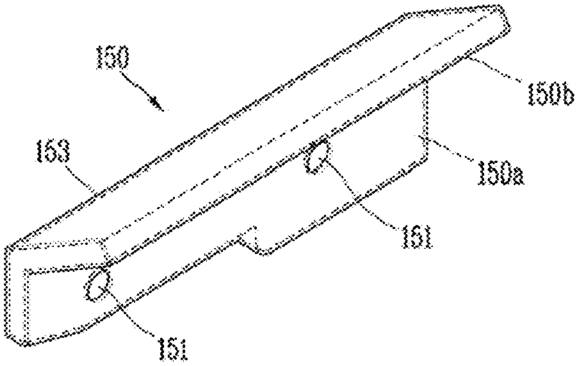
FIG. 9A is a conceptual diagram showing a state where a heat-resistant material is applied to the arc guide as a whole.
Figure 9B:
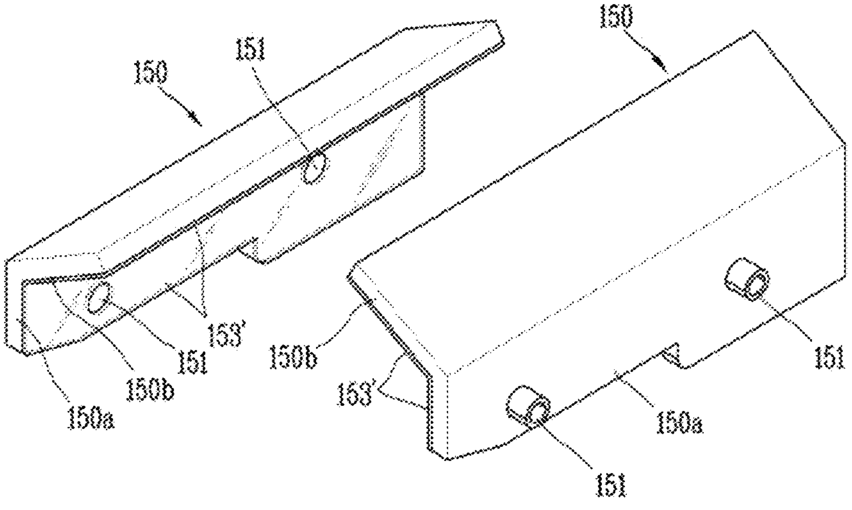
FIG. 9B is a conceptual diagram showing a state where a heat-resistant material is applied to one side surface of the arc guide.

FIG. 9A is a conceptual diagram showing a state where a heat-resistant material is applied to the arc guide as a whole, and FIG. 9B is a conceptual diagram showing a state where a heat-resistant material is applied to one side surface of the arc guide.

When the movable contact point 14*a* and the stationary contact point 13*a* are spaced apart from the lower side of the arc extinguishing assembly 100, an arc is generated. The arc may extend along the movable contact point 14*a*.

Metal gas is generated between the movable contact point 14*a* and the stationary contact point 13*a*, and the pressure of the stationary contact point 13*a* is momentarily increased, and the arc is extended toward the grid 130 and the arc runner 140 by the pressure difference.

The extended arc reaches the plurality of grids 130 and the arc runner 140, and the arc is extended upward and cooled while flowing along the grid 130 and the arc runner 140.

In this case, the arc guide 150 needs to prevent the insulating performance from being weakened, by chemically reacting with the generated arc. If the insulation performance of the arc guide 150 is deteriorated, the arc extinguishing is not sufficiently performed such that problems may occur in that damage to other components of the circuit breaker occurs. This results in weakening of the current blocking performance of the circuit breaker.

To this end, the arc guide 150 may be made of a heat-resistant material. When the arc guide 150 is made of a heat-resistant material, damage and shape deformation due to the generated arc may be prevented.

In particular, in the present exemplary embodiment, the arc guide 150 may be made of a ceramic material to prevent the deterioration of insulation performance while having heat resistance.

Ceramics refer to solid substances that undergo a sintering process in which metals and non-metals or metalloids combine with each other through heat treatment to form crystals, and then the formed crystals are gathered to form a three-dimensional network structure.

Ceramics are basically non-metallic materials that do not have the properties of inorganic materials or metals. Carbon or silicon, which can form crystals through heat treatment, is configured as the main component.

Ceramics are hard and strong, and thus, they can withstand compression well, and they are relatively chemically stable and have high resistance to strong acids, bases and corrosive conditions.

In addition, since the ceramics have high stability against temperature change through a sintering process through heat treatment at a high temperature (1,000° C. or more) in the manufacturing process, it has improved heat resistance.

The arc extinguishing assembly 100 according to the present disclosure may be formed such that a heat-resistant material is applied and coated on the surface of the arc guide 150.

A heat-resistant material may be applied to the outer surface of the arc guide 150. By the heat-resistant material, the outer exposed surface of the arc guide 150 may be covered or applied to form a certain layer.

Herein, the heat-resistant material means a non-metal material, and may mean a ceramic.

For example, a ceramic coating layer 153 may be formed by mixing a ceramic binder and graphite powder and applying a ceramic coating liquid having a low viscosity to the surface of the arc guide 150 to a predetermined thickness.

In this case, as shown in FIG. 9A, the ceramic coating layer 153 may be adsorbed to the surface over the entire area of the first extension portion 150*a* and the second extension portion 150*b* of the arc guide 150 so as to form a ceramic coating layer 153 having a predetermined thickness. Through this, performance such as mechanical strength, heat resistance, abrasion resistance, corrosion resistance, oxidation resistance and the like may be improved.

In addition, as shown in FIG. 9B the ceramic coating layer 153' may be formed in one area of the surface of the first extension portion 150*a* and the second extension portion 150*b*, not the entire area of the surface of the arc guide 150*d*. For example, the ceramic coating layer 153' may be formed on the surface facing the inner side of the arc extinguishing assembly 100 of the first extension portion 150*a* and the second extension portion 150*b*. In other words, the ceramic coating layer 153' may be formed on the outer surface of the first extension 150*a* and the second extension 150*b* to face the grid 130.

Through this, the ceramic coating layer 153' may be formed only in the area where interaction with the generated arc occurs.

The ceramic coating layer 153 may be formed by a method of cleaning and degreasing the surface of the arc guide 150, forming irregularities (not illustrated) having a certain shape in the entire area of the surface of the arc guide 150, and then applying a ceramic coating solution. After the ceramic coating solution is applied to the arc guide 150, when a drying step is performed, the ceramic may be bonded to the surface of the arc guide 150 in a uniformly distributed state.

The arc extinguishing assembly described above and the circuit breaker including the same are not limited to the configuration and method of the above-described exemplary embodiments, but the exemplary embodiments may be configured by selectively combining all or part of each exemplary embodiment such that various modifications may be made.

The present disclosure has industrial applicability, because it is possible to provide an arc extinguishing assembly for effectively extinguishing an arc generated by blocking an electric current.

The invention claimed is:

1. An arc extinguishing assembly, comprising:

a first side member having a first inner surface;

a second side member having a second inner surface that is spaced apart by a certain distance and disposed to face the first inner surface of the first side member;

an exhaust which is installed at an upper part of the first side member and the second side member;

a plurality of grids which are installed between the first side member and the second side member and having both ends fixed to each of the first side member and the second side member; and first arc guide that includes:

a first extension portion that is coupled to both sides of the first inner surface of the first side member and which is installed at a lower part of the plurality of grids;

a second extension portion extending from the first extension portion at a predetermined angle relative to the first extension portion;

wherein at least one area of the first extension portion and the second extension portion of the first arc guide is coated with a first ceramic layer; and a second arc guide that includes:

a first extension portion that is coupled to both sides of the second inner surface of the second side member and which is installed at the lower part of the plurality of grids;

a second extension portion extending from the first extension portion at the predetermined angle relative to the first extension portion, disposed to face the second extension portion of the first arc guide;

wherein at least one area of the first extension portion and the second extension portion of the second arc guide is coated with a second ceramic layer;

wherein each of the first arc guide and the second arc guide has a given heat resistance and comprises a material capable of securing insulation performance even by reaction with a generated arc.

2. The arc extinguishing assembly of claim 1, wherein the first arc guide and the second arc guide each comprises a polyamide resin.

3. The arc extinguishing assembly of claim 2, wherein the polyamide resin comprises any one of nylon 6 (PA6) and nylon 66 (PA66).

4. The arc extinguishing assembly of claim 1, wherein the first arc guide and the second arc guide each comprises a ceramic material.

5. The arc extinguishing assembly of claim 1, wherein the first extension portion and the second extension portion for each of the first arc guide and the second arc guide comprise a ceramic material.

6. The arc extinguishing assembly of claim 1, wherein the first ceramic layer and the second ceramic layer are each coated on an outer surface of the first extension portion and the second extension portion of the first arc guide or the second arc guide, respectively, to face the plurality of grids.

7. The arc extinguishing assembly of claim 1, further comprising:

an arc runner which is inserted between the first side member and the second side member that is spaced apart from a first side of the plurality of grids by a predefined distance, and is bent toward the lower part of the plurality of grids.

8. A circuit breaker, comprising:

a stationary contact;

a movable contact which moves in a direction toward the stationary contact or in a direction away from the stationary contact; and an arc extinguishing assembly which is located adjacent to the stationary contact and the movable contact to extinguish an arc generated by the stationary contact and the movable contact being spaced apart, wherein the arc extinguishing assembly comprises:

a first side member having a first inner surface;

a second side member having a second inner surface that is spaced apart by a certain distance and disposed to face the first inner surface of the first side member;

an exhaust which is installed at an upper part of the first side member and the second side member;

a plurality of grids which are installed between the first side member and the second side member and having both ends fixed to each of the first side member and the second side member;

first arc guide that includes:

a first extension portion that is coupled to both sides of the first inner surface of the first side member and which is installed at a lower part of the plurality of grids;

a second extension portion extending from the first extension portion at a predetermined angle relative to the first extension portion;

wherein at least one area of the first extension portion and the second extension portion of the first arc guide is coated with a first ceramic layer; and a second arc guide that includes:

a first extension portion that is coupled to both sides of the second inner surface of the second side member and which is installed at the lower part of the plurality of grids;

a second extension portion extending from the first extension portion at the predetermined angle relative to the first extension portion, disposed to face the second extension portion of the first arc guide;

wherein at least one area of the first extension portion and the second extension portion of the second arc guide is coated with a second ceramic layer;

wherein each of the first arc guide and the second arc guide has a given heat resistance.

9. The circuit breaker of claim 8, wherein each of the first arc guide and the second arc guide comprises a polyamide resin, and wherein the polyamide resin comprises any one of nylon 6 (PA6) and nylon 66 (PA66).

10. The circuit breaker of claim 8, wherein each of the first arc guide and the second arc guide comprises a ceramic material.

* * * * *